United States Patent [19]

Spencer et al.

[11] Patent Number: 5,593,098

[45] Date of Patent: Jan. 14, 1997

[54] APPARATUS FOR AND METHOD OF PULPING WASTE PAPER

[76] Inventors: Mark W. Spencer, 1451 Milwaukee St., Delafield, Wis. 53018; Donald C. Cheesman, 993 Lake Country Ct., Oconomowoc, Wis. 53066

[21] Appl. No.: 659,878

[22] Filed: Jun. 7, 1996

[51] Int. Cl.⁶ ............................ B02C 18/40; B02C 23/18
[52] U.S. Cl. .................... 241/46.01; 241/46.17; 241/79.1; 241/154; 241/DIG. 38
[58] Field of Search ................ 241/41, 43, 46.01, 241/46.17, 79.1, 154, 165.5, DIG. 38

[56] References Cited

U.S. PATENT DOCUMENTS

| | | | |
|---|---|---|---|
| 2,076,899 | 4/1937 | Lamort | 241/46.17 |
| 2,340,720 | 2/1944 | Wells | 241/46.17 X |
| 3,741,863 | 6/1973 | Brooks | 162/4 |
| 3,814,336 | 6/1974 | Brewer | 241/79.1 |
| 4,017,033 | 4/1977 | Tra | 241/28 |
| 4,030,670 | 6/1977 | Abernathy | 241/14 |
| 4,160,722 | 7/1979 | Marsh | 209/4 |
| 4,382,559 | 5/1983 | Hellberg | 241/79.3 |
| 4,385,997 | 5/1983 | Stradal | 210/784 |
| 4,615,492 | 10/1986 | Downie | 241/46.01 |
| 4,650,125 | 3/1987 | Pellhammer | 241/21 |
| 4,687,146 | 8/1987 | Sundman | 241/79.3 |
| 4,867,383 | 9/1989 | Terry | 241/24 |
| 4,991,720 | 2/1991 | Hoglund | 209/12 |
| 5,007,590 | 4/1991 | Taylor | 241/25 |
| 5,125,584 | 6/1992 | Vuorinen | 241/46.17 |
| 5,257,740 | 11/1993 | Prew et al. | 241/21 |
| 5,262,003 | 11/1993 | Chupka | 162/4 |
| 5,324,389 | 6/1994 | Spencer | 162/4 |
| 5,358,184 | 10/1994 | Skudrzyk | 241/16 |
| 5,372,316 | 12/1994 | Bateman | 241/191 |
| 5,377,918 | 1/1995 | Pastor | 241/46.17 |

*Primary Examiner*—John M. Husar
*Attorney, Agent, or Firm*—Robert T. Johnson

[57] ABSTRACT

Pulping of waste paper is accomplished by the apparatus of this invention which includes a water supply and twin tube cylinder tanks mounted horizontally, and a shaft extending inside of the tanks, and flinger arms attached to the shafts, and the shafts rotate, being driven by electric motors, to pulp the waste paper in a water suspension, and the pulp slurry screened through a bank or plurality of perforated troughs and a perforated screw conveyor mounted in the perforated trough.

3 Claims, 6 Drawing Sheets

APPARATUS FOR AND METHOD OF PULPING WASTE PAPER

Recovery and use of waste paper is of great concern and benefit to the national economy, and in view of this the invention which is disclosed in the following specification and claims describing apparatus and method for pulping waste paper of all types including newsprint, box board writing paper etc.

BACKGROUND OF THE INVENTION

To date the apparatus for pulping, involves in general, a propeller extending into a tank containing waste paper in water, and the propeller being driven by a motor to disperse the fibers.

Prior art pertaining to dispersing and pulping apparatus is as follows.

U.S. Pat. No. 3,741,863 to BROOKS. Disclosure is made of a dry process for solid waste recovery and the fibers may be used for board or paper production.

U.S. Pat. No. 4,017,033 to JOSEF TRA. Disclosure is made of a slusher and a sieve mounted behind an impeller in the slusher. The claims of this patent include only the slusher, perforated plate and impeller.

U.S. Pat. No. 4,160,722 to MARSH. This patent discloses a rotor in a tub for disintegrating fibers and air separation of plastic pieces.

U.S. Pat. No. 4,382,559 to HELLBERG. This patent discloses utilization of corrugated paper and includes a cylinder tumbling apparatus, and longitudinal vanes or blades, which rotate in the same direction as the cylinder, but at a higher rpm than the cylinder. (see FIGS. 2 and 3 of this patent)

U.S. Pat. No. 4,385,997 to STRADAL. Method and apparatus is disclosed for treatment of corrugate material.

U.S. Pat. No. 4,650,125 to PELLHAMMER. Disclosure is made of paddles in a horizontal tank, and a domed guide surface to guide the fiber stock mass.

U.S. Pat. No. 4,687,146 to SUNDMAN. A rotating drum, with a perforated plate on the outlet end of the drum is disclosed, with retention control in the drum being a function of the opening in a partition wall.

U.S. Pat. No. 4,867,383 to TERRY. Disclosure is made of shredding and screening of waste paper by means of passing through a fan.

U.S. Pat. No. 4,991,720 to HUGLAND. This patent discloses an apparatus for dividing a suspension of fibrous cellulose pulp by means of a flat disc having teeth and rotation of this disk.

U.S. Pat. No. 5,125,584 to VUORINEN. Disclosure is made of rotor units and screen plates for pulp purification.

U.S. Pat. No. 5,262,003 to CHUPKA. This patent discloses treating fibrous materials with steam under pressure and a feed screw.

U.S. Pat. No. 5,372,316 to BATEMAN. Disclosure is made of swing hammers and hog for processing of waste for subsequent processing.

U.S. Pat. No. 5,324,389 to SPENCER. Disclosure is made in this patent of apparatus of drum type pulpers, and including arms and buckets on the arms which dip into the pool of stock in the drum pulper.

U.S. Pat. No. 5,377,918 to PASTOR. A pulper is disclosed of a spiral shaped rotor for driving foreign bodies upward in an archimedes screw.

BRIEF SUMMARY OF THE INVENTION

Disclosure is made of apparatus for and method of pulping of waste paper and includes a bank or plurality of modified horizontal drums described as twin tube cylinders with a central shaft extending horizontally through each cylinder and each shaft connected to a drive means to rotate the shaft, and a plurality of flinger arms mounted on each shaft.

The horizontal dual drums or twin tube cylinders are assembled lengthwise, and the assembled dual drum pair or twin tube cylinders are open each to the other equal to about from one half to two thirds of the diameter of the cylinders or drums, and assembled pairs of the dual drums or twin tube cylinders are mounted horizontally and each assembled dual drum pair or twin tube cylinders are parallel and stacked one dual drum pair or twin tube cylinder above another as required for adequate dispersion or pulping. It is preferred to provide a stack of two dual drum pairs or twin tube cylinders mounted parallel and horizontally one pair over the other for adequate pulping, to provide adequate beating or pulping time of the waste paper water mix. To provide feed of the waste paper to the assembled dual drum pairs, or twin tube cylinders there is provided a feed inlet for the waste paper and a water inlet on the top end of the upper assembled dual drum pair, or twin tube cylinder and an outlet on the bottom at the end opposite the inlet of the assembled dual drum pair and this outlet feeds or flows into the inlet of the lower assembled dual drum pair or twin tube cylinder mounted below the upper assembled dual drum pair or twin tube cylinder and the outlet at the end opposite the inlet of the lower assembled dual drum or twin tube cylinder feeds into a tank for this crude pulp slurry. To remove trash and stickies this crude pulp slurry flows through a perforated screw conveyor in a screen or perforated trough and the trash and stickies are moved upward by the perforated screw and discharged to waste and the screened pulp slurry obtained after screening by the screw trough is free of trash and stickies.

OBJECTS OF THE INVENTION

An object of this invention is to disclose apparatus for and method of pulping waste paper which includes an assembly of dual drums or twin tube cylinders comprising a single unit and open each to the other equal to about from one half to two thirds of the diameter of the drums or cylinders and shafts extending lengthwise centered in each of the dual drums or twin tube cylinders and flinger arms mounted on the shafts and mounted at a pitch to move the slurry in a direction away from the inlet and towards the outlet of the dual drum or twin tube cylinders.

Another object of this invention of apparatus for and method of pulping waste paper is to disclose stack mounting, in parallel of at least two horizontal assemblies of dual drums one above the other and shafts extending horizontally in each dual drum or twin tube cylinder assembly and flinger arms mounted on the shafts at a pitch to move the slurry from the inlet to the outlet of the assembled dual drums or twin tube cylinder assembly and the flinger arms mounted on the shafts in each of the assembled dual drums or twin tube cylinder assembly.

Another object of this invention of apparatus for and method of pulping waste paper is to disclose an assembly of perforated troughs, and perforated screw conveyors under the outlet of the lowest dual drum or twin tube cylinder assembly pair for screening of the outflow of the pulp slurry

LEGENDS OF DRAWINGS 1, 1', 1", 1'"—Twin tube pulping cylinders.
2—Flinger arms.
3—Shafts.
4—Water inlets.
5—Electric motors.
6—Perforated trough for conveyor screw.
7—Spiral perforated screw conveyor.
8—Crude pulp slurry tank.
9—Aeration nozzles—compressed air inlet.
10—Trash removed.
11—Screened pulp.
12—Crude pulp.
13, 13',13"—Baffles.
14—Screened pulp outlet.
15, 15'—Pulp slurry outlets, or flow ducts.
16—Perforations in trough for conveyor screw.
17—Sludge drain from screw flight trough.
18—Waste paper feed inlet.
19—Water feed inlet.
20—Ink sludge discharge.
21—Split ring mount for flinger arms.
22—Split ring fasteners.
23—Bolt mount for flinger arm attachment to split ring mount.
24—Clean out doors.
25—Waste paper feed.
26—Discharge end of screw conveyor.
27—Collector tank for screened pulp slurry.
28—Motor drive for screw conveyor.
29—Trailing or back side of flinger arm.
30—Leading or front side of flinger arm.
31—Brackets for mounting of baffles.
32, 32'—Maximum pulping area.
33—Perforations in screw conveyor.
34—Outer end of flinger arms.
A—Angle from horizontal of flinger arm face.
F—Flow direction of slurry.
D—Diagonal mounting angle of perforated troughs with perforated screens.

DETAILED DESCRIPTION OF THE INVENTION

This disclosure describes apparatus and method of pulping of waste paper and includes a bank or plurality of at least two horizontal drums attached each to the other, lengthwise and are described as twin tube cylinders 1, 1' (see FIGS. 1 and 2) with a central shaft 3 in each of the tube cylinders and the shafts 3 extending horizontally through each tube cylinder 1, 1' 1" 1'" and each shaft 3 connected to a drive means such as an electric motor 5, to rotate the shaft 3, and a plurality of flinger arms 2 (see FIGS. 1, 7, 10) mounted on each shaft 3.

Figure 4:
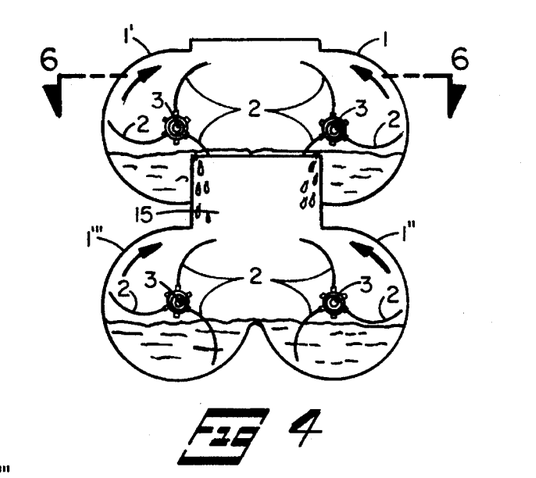
FIG. 4—Cross section end elevational view of twin tube cylinders and flow duct from upper cylinders to lower cylinders.
Figure 5:
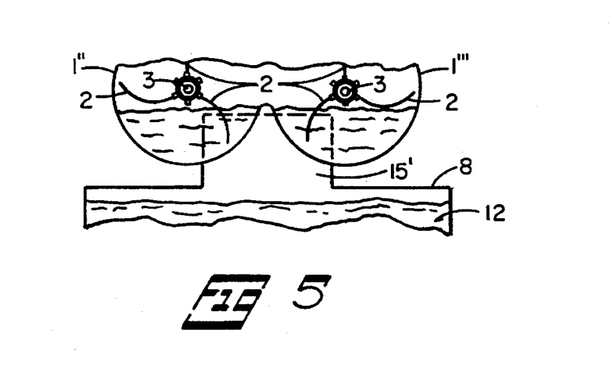
FIG. 5—Cross section end elevational view of flow duct from lower twin tube cylinder to crude slurry pulp tank.

The horizontal dual drums or twin tube cylinders 1, 1' 1" 1'" are assembled lengthwise, (see FIGS. 1, 4, 10) and the assembled dual drum pair 1, 1' or 1", 1'" twin tube cylinders are open each to the other of the pair equal to about from one half to two thirds of the diameter of the cylinders or drums, (see FIGS. 2, 10) and assembled pairs of the dual drums or twin tube cylinders 1, 1' and pair 1", 1'" are mounted horizontally (see FIGS. 1, 12) and each assembled dual drum pair or twin tube cylinders 1, 1' and pair 1", 1'" are parallel and stacked one dual drum pair or twin tube cylinder 1, 1' stacked or mounted above another pair 1", 1'" as required for adequate dispersion or pulping. It is preferred to provide a stack of two dual drum pairs or twin tube cylinders 1, 1' mounted horizontally over another pair 1", 1'" for adequate pulping, to provide adequate beating or pulping time of the waste paper water mix. To provide feed of the waste paper 25, to the assembled dual drum pairs, or twin tube cylinders 1, 1' there is provided a feed inlet 18 for the waste paper 25, and water inlets 4 on the top end of the upper assembled dual drum pair or twin tube cylinder 1, 1' and a pulp slurry outlet 15 on the bottom at the end opposite the inlet of the assembled dual drum pair 1, 1' and this outlet 15 feeds into the inlet of the lower assembled dual drum pair or twin tube cylinder 1", 1'" mounted below the upper assembled dual drum pair or twin tube cylinder 1, 1' and the pulp outlet 15' at the end opposite the inlet of the lower assembled dual drum or twin tube cylinder 1", 1'" feeds into crude pulp slurry tank 8 (see FIGS. 2, 3, 5) for crude pulp slurry 12. To remove trash and stickies 10, the crude pulp slurry 12 flows through an assembly of perforated trough or screen 6, and a spiral screw conveyor 7 having perforations 33, mounted in the perforated or screen trough 6 and trash 10 and stickies 10 are moved upward by the perforated 33 screw conveyor 7 and discharged to waste at the discharge end 26 of the spiral perforated screw conveyor 7, and the screened pulp slurry 11 obtained after screening by the screw trough 6 assembly is free of trash and stickies and collects in tank 27 (see FIG. 2, 3).

Figure 6:
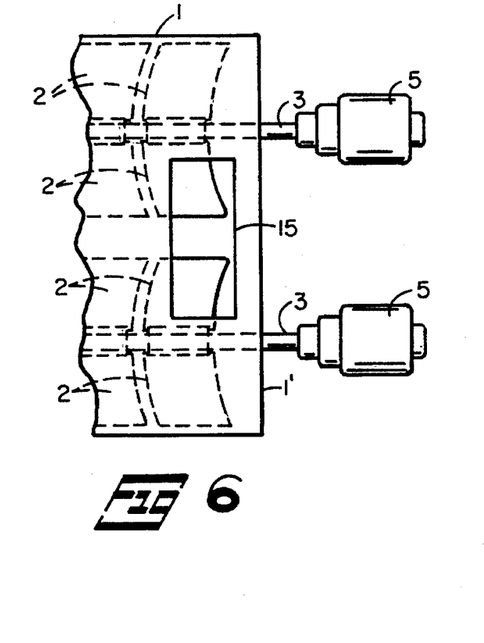
FIG. 6—Plan view of overflow duct from upper twin tube cylinder pulper to lower twin tube cylinder pulper.
Figure 7:
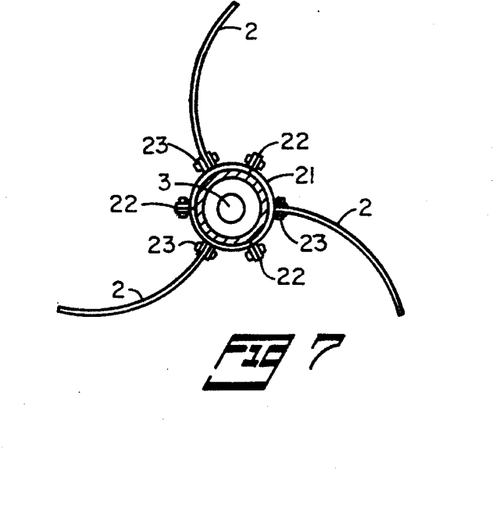
FIG. 7—Mounting of flinger arms on split ring around shaft.
Figures 8, 9:
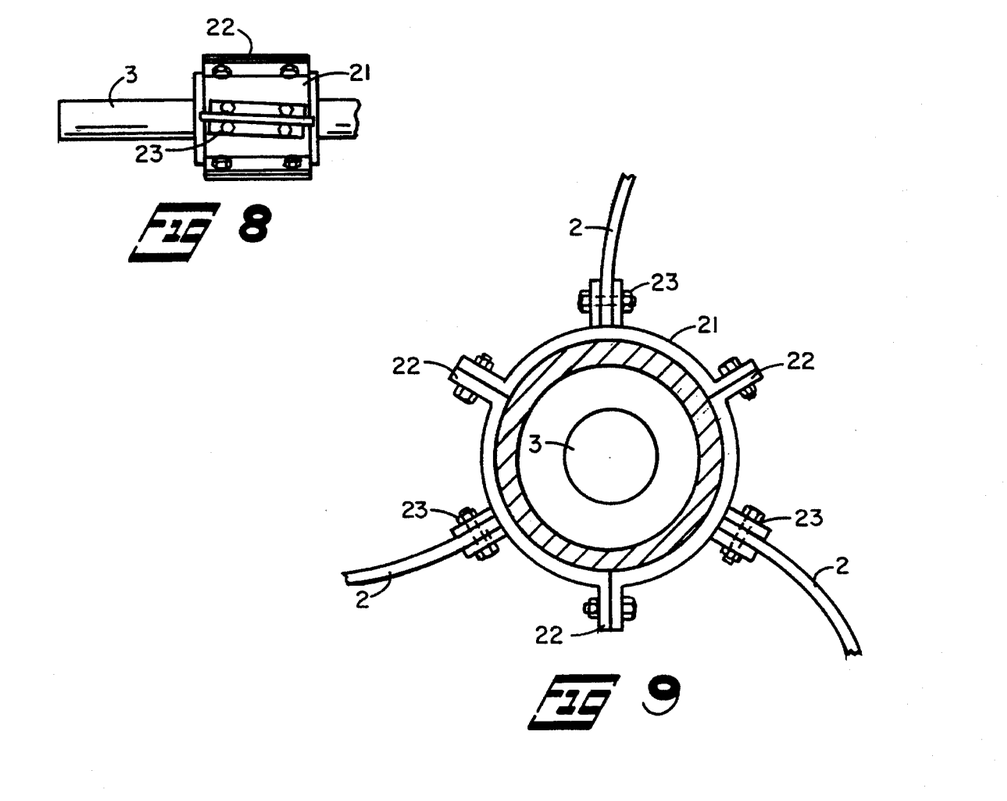
FIG. 8—Isolation elevation view of split ring for mounting of flinger arms.
FIG. 9—Enlarged cross section view of shaft and flinger arm mounts.
Figure 11:
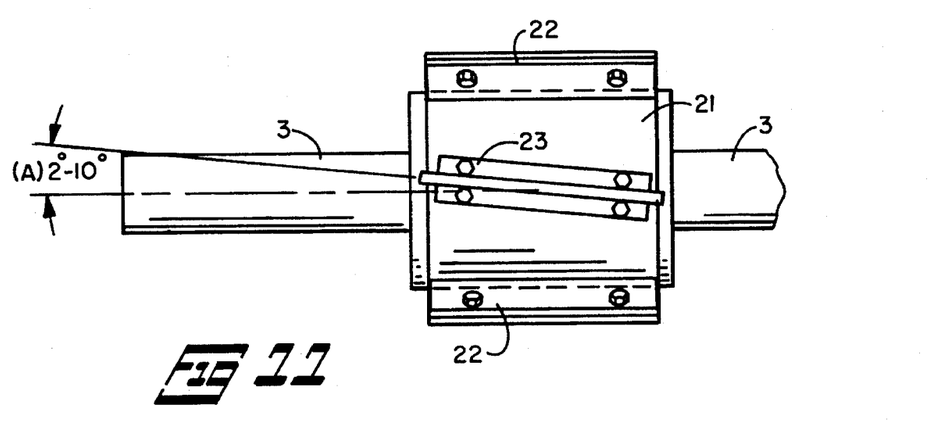
FIG. 11—Enlarged side elevational view of split ring mount on shaft for mounting of flinger arms.
Figure 12:
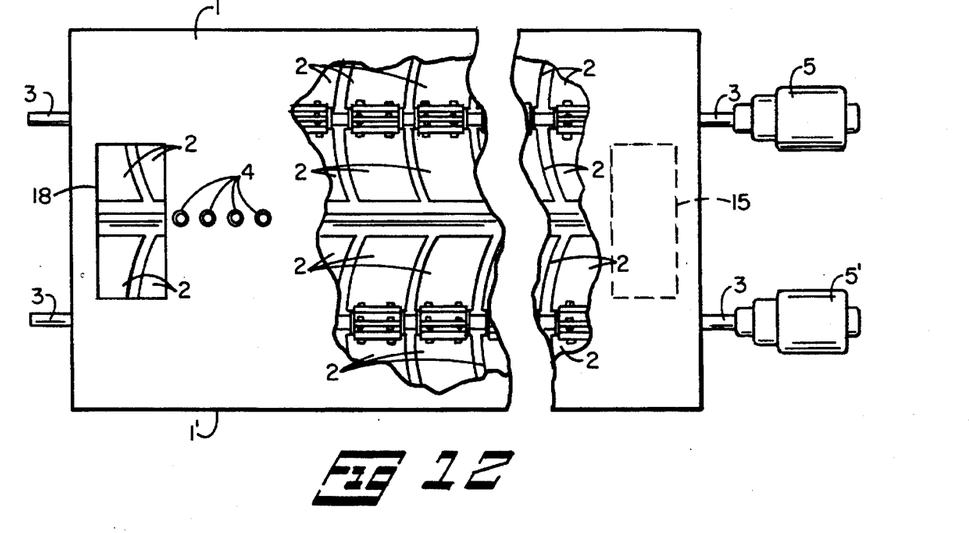
FIG. 12—Plan view of twin tube cylinder pulping tank with top partly uncovered.

The pulp slurry outlets 15 and 15' can best be described as a standpipe or overflow which extends upward to be at about the level of the shafts 3, and extends for a width between the shafts 3 as shown in FIGS. 6 and 12 and maintains a slurry in the tank for continuous beating by flinger arms 2. Referring now to FIGS. 7 and 9, the flinger arms 2, are shown mounted on split ring 21 mount for the flinger arms 2 which are mounted on the split ring 21 by bolt mounts 23 for flinger arm attachment to split ring mount 21. To further show the mounting of the flinger arms 2, mounted on split ring mount 21, reference is now made to FIGS. 8 and 11. The flinger arms 2 are mounted on the split ring 21 at an angle A of about 2° to about 10° from the horizontal position of the shafts 3, which positioning of the mounting angle gives the flinger arms some propeller action to push the pulping slurry toward the outlets 15, 15' end of the twin tube pulping cylinder 1, 1' and 1", 1'".

Figure 1:
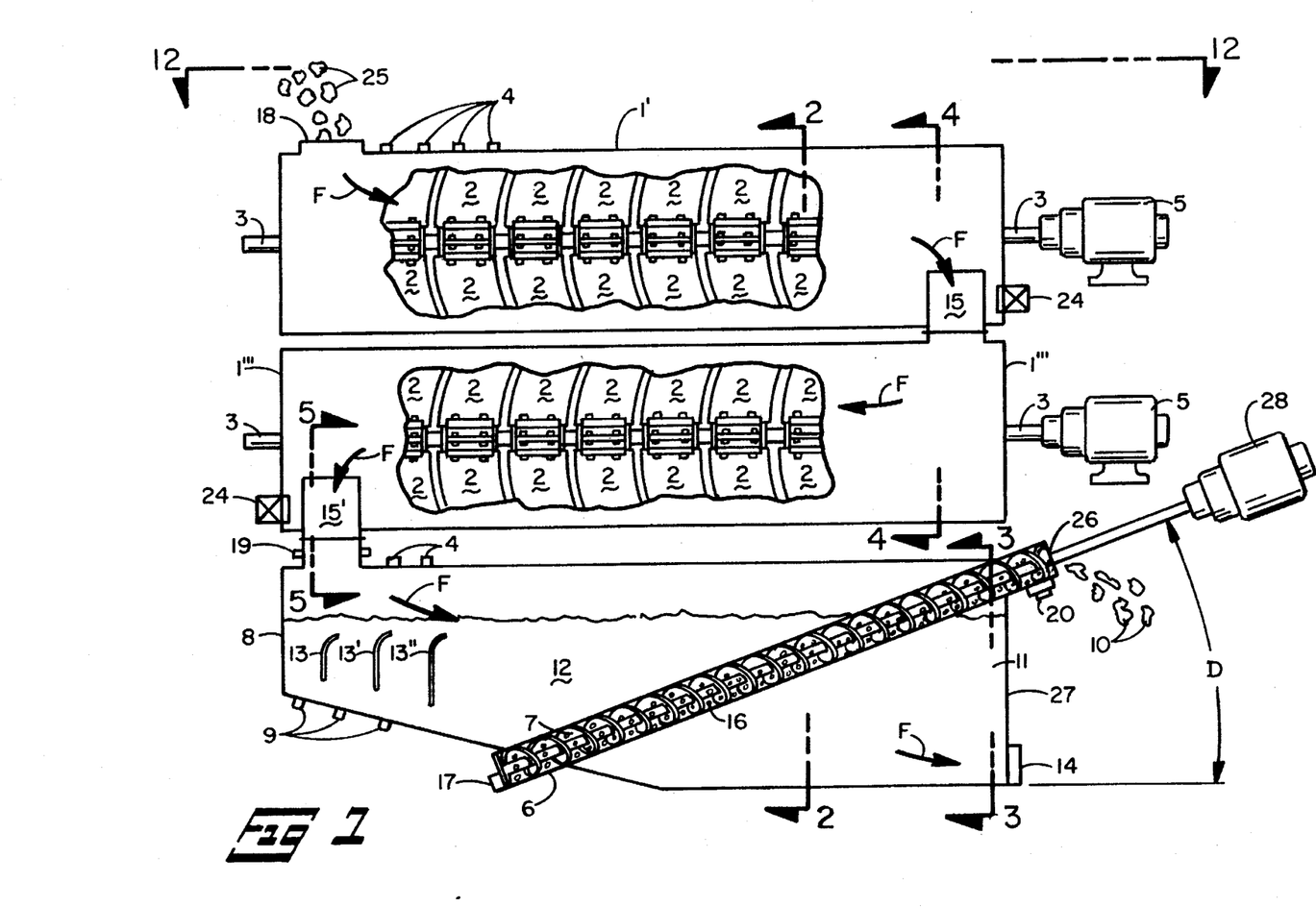
FIG. 1—Side elevational view of dual or twin tube cylinder pulping tank assembly.
Figure 14:
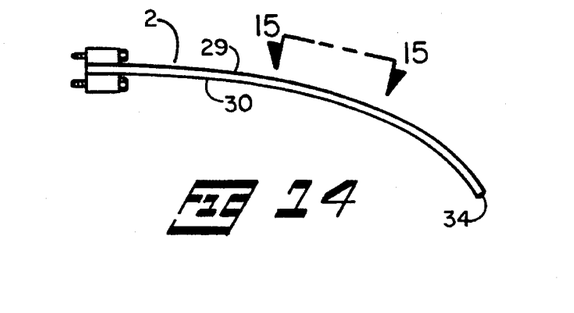
FIG. 14—Flinger arm.
Figure 15:
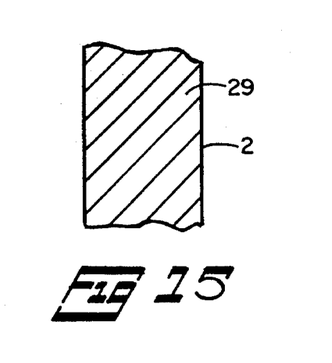
FIG. 15—Cross section of flinger arm.

FIG. 14 shows a typical flinger arm 2, and legend 29 shows the top or back side, legend 30 shows the under side which on mounting the flinger arm 2, at an angle as described above gives the propeller action above mentioned, to give proper flow, as indicated by legend F, in the pulping apparatus shown in FIG. 1. FIG. 15 is a section view showing the top side 29 of flinger arm 2.

Figure 13:
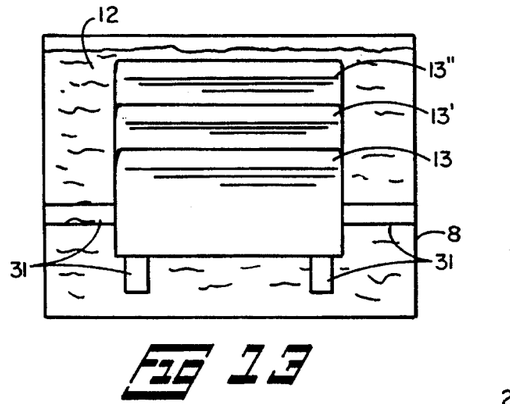
FIG. 13—Baffle plates.

FIG. 13, shows an end view of crude pulp slurry tank 8, and shows the baffles 13, 13' and 13" as mounted on brackets 31 in tank 8 holding crude pulp 12. Air inlet nozzles 9 mounted under the baffles 13, 13' 13", which air inlet nozzles 9 direct air up through the baffles 13, 13' 13" to help float any stickies in the crude pulp 12, which are washed into the perforated trough 6, and moved upward to discharge end 26 on actuation of the spiral perforated screw conveyor 7 in perforated trough 6 for conveyor screw 7. Referring now to FIGS. 1 and 13, the baffles 13, 13' 13" are mounted vertically on brackets 31 and the top edges of the baffles are bent lengthwise in a 90° arc at about a 5 inch radius, and arc edges pointing toward the perforated troughs 6. Water feed inlets 4' and 19 inlets are located to add water to tank 8 and in the pulp slurry outlet 15', or elsewhere as needed.

Figure 16:
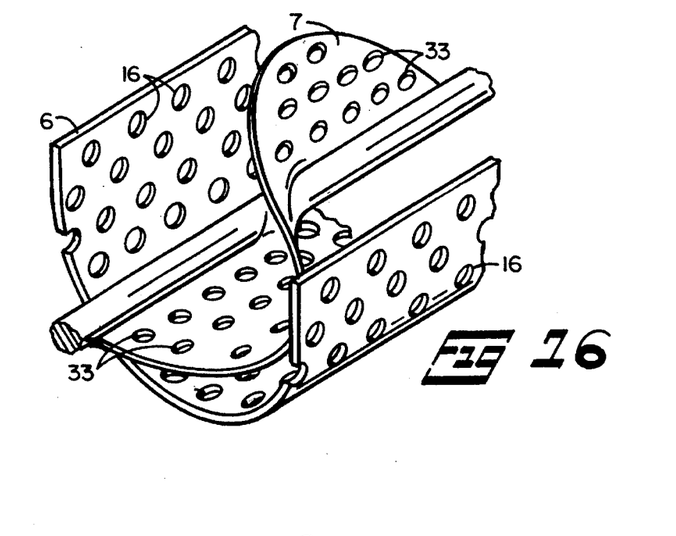
FIG. 16—Section in perspective of a perforated trough and spiral screw conveyor.

FIG. 16 is a segment of the perforated trough 6 for conveyor screw and legend 16 are the perforations in the trough 6, for the conveyor screw 7. Referring now to FIG. 1 the perforated trough section is mounted at an angle to raise the oversize pieces from the crude pulp 12 in tank 8, and discharge the oversize and stickies at discharge end 26 of screw conveyor for trash removed 10. At the lower end of the perforated trough 6 there is a 17 sludge drain from this screw flight trough 6.

Figure 2:
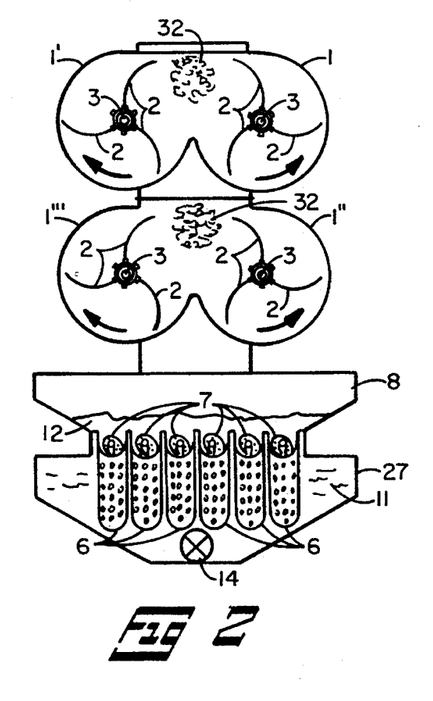
FIG. 2—Cross section elevational view of twin tube cylinders and collector tank.
Figure 3:
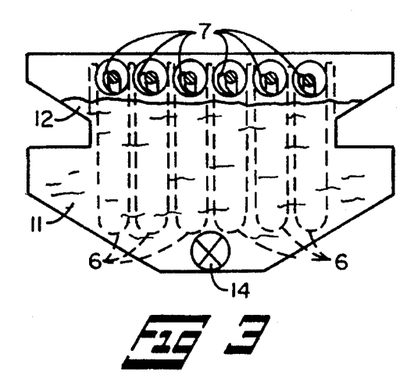
FIG. 3—End elevational view of screened pulp slurry tank.

In the above discussion there is described the conveyor screw 7 and the perforated trough 6 but now on referring to FIGS. 2 and 3 there is shown a bank of perforated troughs 6, and screw conveyors 7 for screening the crude pulp 12 and as noted in these FIGS. 2 & 3 all the crude pulp 12 is channeled onto the perforated troughs 6 and the screened pulp 11 is collected in tank 27, and is described as "screened" pulp to differentiate this from the crude pulp 12. Motor drive 28, actuates the screw conveyor.

As stated above the bank of perforated troughs 6, with perforated screws 7, are mounted diagonally and extending upward at an angle D, as shown in FIG. 1, and this angle can be from about 20° to about 40°.

Referring now to FIG. 1, legend 14 is screened pulp outlet for further processing such as paper forming of this pulp slurry. Provision is made for ink sludge discharge 20, at the outlet end of perforated trough 6, for conveyor screw 7.

Clean out doors 24, (see FIG. 1) are mounted on the outlet ends of the twin tube pulping cylinders 1 1' and 1" 1'", or can be mounted elsewhere as desired.

In all of the above discussion the perforated trough 6 and the spiral screw conveyor 7, having perforations 33, are discussed as a singular unit but as shown in FIG. 2, there is an assembly or a bank of such apparatus, for screening the crude pulp to remove the trash, and ink sludge to give a screened pulp 11.

Crude pulp, as described above, is the unscreened pulp as obtained from the twin tube pulping cylinders 1" and 1'".

In regard to the flinger arms 2, there is a plurality of these attached to the shafts 3 of the twin tube pulping cylinders. These flinger arms are attached in sets of three as shown in FIGS. 2, 4, 7, 9, and 10 and sets of these are mounted on shafts 3, thus a shaft of 20 feet in length there would be about twenty sets of these flinger arms.

Figure 10:
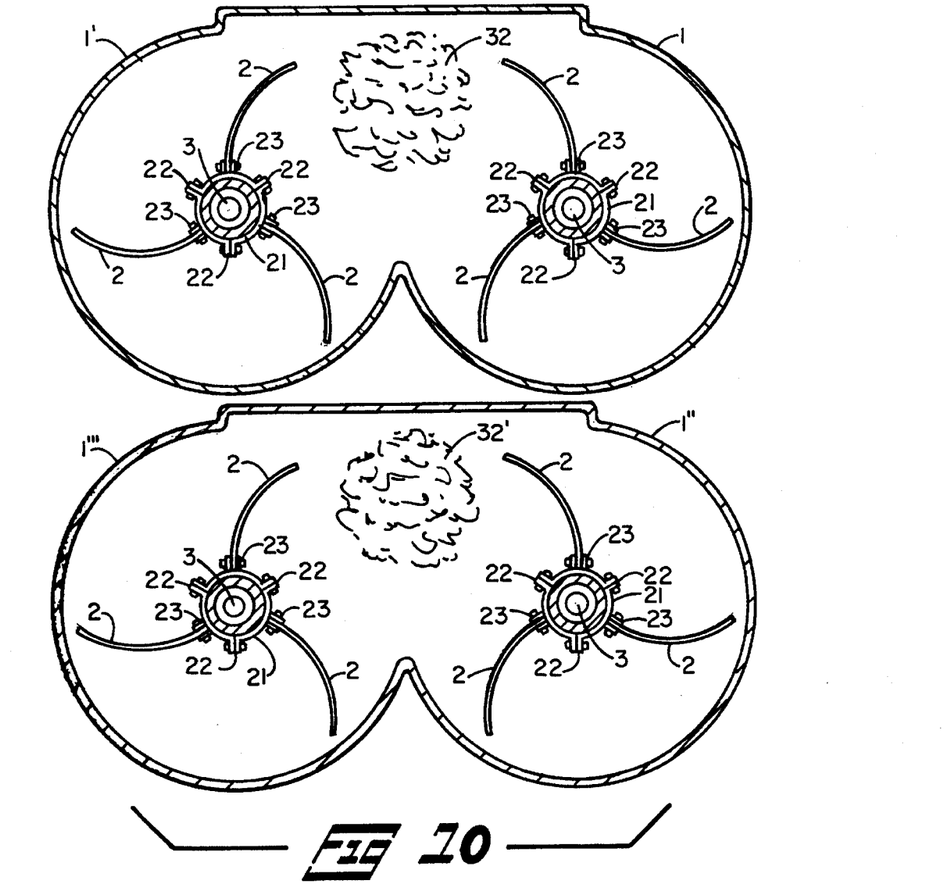
FIG. 10—Enlarged cross section end view of twin tube cylinder mounts as mounted for pulping.

It is important in this invention that the shafts 3 on which the flinger arms 2 are mounted that the shafts revolve in the direction shown in FIGS. 2 and 10, which is in twin tube cylinder 1' the shaft revolves clockwise, while in twin tube cylinder 1, the shaft revolves counter-clockwise and in twin tube cylinder 1'" the shaft revolves clockwise, and in twin tube cylinder 1" the shaft revolves counter-clockwise with the outer ends 34, of the flinger arms 2 leading in the direction of rotation such that pulping slurry in cylinders 1, 1' and 1", 1'" is thrown together as shown in FIGS. 2 and 10, legends 32 and 32', for maximum pulping action.

In this invention the rate of rotation of the shafts would be from about 40 to 200 rpm for adequate pulping.

Referring now to FIGS. 2 and 10, legends 32 and 32' indicate the maximum pulping area of this apparatus due to the impacting of the slurry between the flinger arms.

The arms 2, would extend to about 3 or 4 inches from the walls of the cylinders 1, 1' 1" 1'" which could be a radius of about twenty four to sixty inches or more in diameter.

Figure 17:
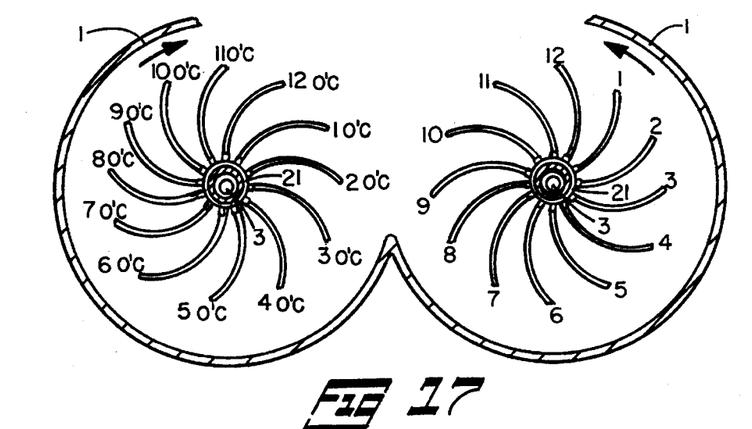
FIG. 17—Flinger arms alignment.

To attain maximum efficiency of this pulping apparatus the flinger arms 2 are mounted onto the split ring fasteners 22, in sets of three flinger arms per split ring fastener 22 and now referring to FIG. 12, which is a plan view of the pulping apparatus the flinger arms 2 are shown, and are to be mounted on the shafts 3, 3, to be as shown in FIG. 17, which is to show flinger arms alignment. Commencing at the waste paper feed 18, as shown in FIG. 12 plan view of the pulping tank, a set of three flinger arms are mounted on split ring 21 mount for flinger arms on the shaft 3 end inside the twin tube pulping cylinder 1' and one arm is mounted at the 12 o'clock position, and in twin tube pulping cylinder 1, a set of three flinger arms is mounted on shaft 3 in cylinder 1, in line with the flinger arm mount in twin tube pulping cylinder 1'. The next set of flinger arms 2 are mounted on a split ring mounted next to the first split ring mount 21, and in this next mount in twin tube pulping cylinder 1', one flinger arm 2 is mounted in the 1 o'clock position, and in twin tube cylinder 1 this next mount of the flinger arms is mounted in the 1 o'clock position, which is then in line with the flinger arms 2 in twin tube pulping cylinder 1'. The next alignment is at the 2 o'clock position, then 3 o'clock then 4 o'clock etc. and continuing for the length of the shafts 3.

With the above alignment of the flinger arms 2, there is a maximum pulping action as the arms on shafts 3 in twin tube pulping cylinders 1, 1' 1" 1'", cause maximum pulping in area 32. Flinger arms 2 mounting in twin tube pulping cylinders 1" and 1'" are mounted in the same manner as described above in twin tube cylinders 1 and 1'.

To describe this apparatus in practical dimensions the twin tube pulping cylinders 1, 1' and 1", 1'" can have a length of about 20 feet, and a diameter of 5 ft. of each tube segment of the twin tube pulping cylinder, and the split ring mounts 21 having a length of about 12 inches, and the flinger arms having a width of 11¾ inches, and a length of arc of about 25 inches, and the arc having a radius of about 18 inches.

The apparatus of this invention can be described further as a twin tube pulping cylinder tank 1, 1' pair mounted horizontally (see FIG. 1) and water inlets 4 in the twin tube pulping cylinder tank 1, 1' mounted horizontally above and parallel to a lower twin tube pulping cylinder tank 1", 1''' and a waste paper feed opening 18 on the top of the twin tube pulping cylinder tank 1, 1' mounted over a lower twin tube pulping cylinder tank 1" 1''', and the waste paper feed opening 18 of the twin tube pulping cylinder tank 1, 1' located at the top and end of the upper twin tube pulping cylinder tank 1, 1' and a shaft 3, in each of the twin tube pulping cylinders 1, 1', 1", 1''' and each shaft 3, extending to an electric motor 5, and a plurality of flinger arms 2, (see FIGS. 7, 9, 10, 12, 18) in sets of three (see FIGS. 7, 10) attached to split ring fasteners 22, on split ring mount 21, for flinger arms 2, on shafts 3, and a pulp slurry outlet 15, extending from the upper twin tube pulping cylinder tank 1, 1' (see FIG. 4) mounted above the lower twin tube lower twin tube pulping cylinder tank 1", 1''' and the pulp slurry outlet or flow duct 15 extending into the lower twin tube pulping cylinder tank 1", 1''' and a pulp slurry outlet 15' from the lower twin tube pulping cylinder tank 1", 1''' to crude pulp slurry tank 8, and a plurality of perforated conveyor troughs 6 mounted diagonally upward (see FIG. 1) in the crude pulp slurry tank 8, and a perforated screw conveyor 7, mounted in each of the perforated troughs 6 and a tank 27 mounted under the plurality of perforated conveyor troughs 6, (see FIG. 2).

As an alternate to the radius noted above for the flinger arms 2, the flinger arms may be of a cycloid shape.

Reference is now made to FIG. 1, wherein legend F indicates the flow direction of the slurry through the twin tube pulping cylinders 1, 1', 1", 1''' and through the perforated trough 7, and conveyor screw 6.

Figure 18:
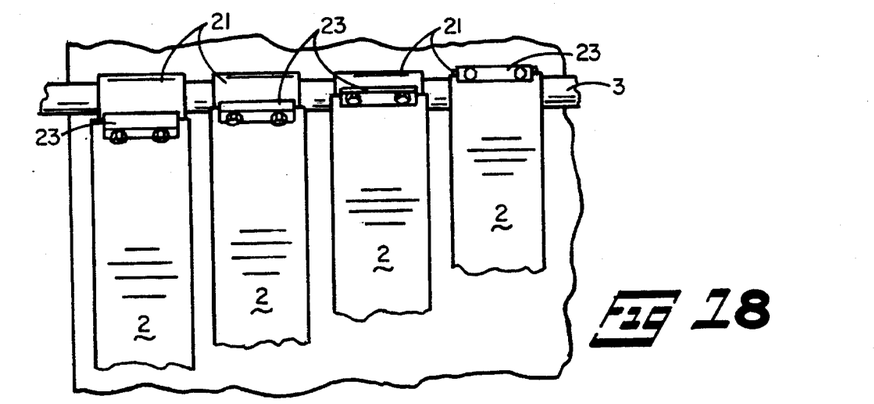
FIG. 18—Relation of flinger arms to pulping cylinder.

In regard to the mounting, as discussed above, of the flinger arms 2, on the shaft 3, FIG. 18 shows the relationship of these flinger arms 2, to the twin tube pulping cylinder 1 as an example and would be the same for all of the twin tube pulping cylinders in relation to flinger arms 2, which are all the same length and width.

The perforations 16 in the conveyor troughs 7 and perforated spiral screw conveyor 6 which are mentioned in the above discussion can range in size from 0.25 inches to 0.50 inches in diameter (6.25 mm to 12.5 mm diameter) depending on pulp fineness desired.

It is to be pointed out that the pulping apparatus includes water inlets 4 and 19 which may be located in many different locations on the twin tube pulping cylinder tanks 1, 1', 1", 1''' and on the pulp slurry tanks 8 and 27.

In the above description of this invention, the word "stickies" is used. The meaning of this word is material other than paper, and is to include plastics such as glassine, and other trash which floats on the surface of the crude pulp slurry.

Having described our invention we claim:

1. Apparatus for pulping of waste paper comprising;
   a—twin tube pulping cylinder tank mounted horizontally and water inlets and
   b—said twin tube pulping cylinder tank mounted horizontally above and parallel to a lower twin tube pulping cylinder and,
   c—paper feed opening on the top of said twin tube pulping cylinder mounted over said lower twin tube pulping cylinder and,
   d—said paper feed opening of said twin tube pulping cylinder tank located at the top and end of said upper twin tube pulping cylinder tank and,
   e—a shaft in each of said twin tube pulping cylinders, and each said shaft extending to an electric motor and,
   f—a plurality of flinger arms in sets of three attached to split ring fasteners on said shafts and,
   g—a pulp slurry outlet extending from said upper twin tube pulping cylinder tank mounted above said lower twin tube pulping cylinder, and said outlet extending into said lower twin tube pulping cylinder tank and,
   h—a pulp slurry outlet from said lower twin tube pulping cylinder tank to crude pulp slurry tank and
   i—aeration nozzles for compressed air inlet into bottom of said crude pulp slurry tank and said aeration nozzles directed upward to vertically mounted baffle plates and
   j—a plurality of perforated conveyor troughs mounted diagonally upward in said crude pulp slurry tank and,
   k—a perforated screw conveyor mounted in each of said perforated troughs and,
   l—a tank mounted under said plurality of perforated conveyor troughs.

2. In apparatus of claim 1, for pulping waste paper, further improvement comprises;
   a—said flinger arms having an arcuate shape and
   b—said flinger arms mounted on said split ring mount and,
   c—said flinger arms mounted at an angle of about 2° to 10° from the horizontal of said split ring mount to give propeller action by said flinger arms to the pulp slurry.

3. Apparatus for pulping waste paper of claim 1 further improvement comprises;
   a—a bank or plurality of perforated troughs and
   b—perforated screw in each of said perforated troughs and,
   c—electric motor drive connected to each of said perforated screws and,
   d—said perforated troughs and perforated screws mounted upward diagonally in a crude pulp slurry tank at an angle of 20° to 40° and a tank for screened pulp for collection of pulp slurry through said perforated troughs and said perforated screws.

\* \* \* \* \*